US009510206B2

(12) United States Patent
Liu et al.

(10) Patent No.: US 9,510,206 B2
(45) Date of Patent: Nov. 29, 2016

(54) SPECTRUM RESOURCE RECONFIGURATION METHOD, DEVICE, AND SYSTEM

(75) Inventors: Xing Liu, Shenzhen (CN); Yan Li, Shenzhen (CN); Ting Miao, Shenzhen (CN); Longtao Ren, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 191 days.

(21) Appl. No.: 14/240,961

(22) PCT Filed: Jun. 29, 2012

(86) PCT No.: PCT/CN2012/077856
§ 371 (c)(1),
(2), (4) Date: Feb. 25, 2014

(87) PCT Pub. No.: WO2013/029417
PCT Pub. Date: Mar. 7, 2013

(65) Prior Publication Data
US 2014/0211654 A1    Jul. 31, 2014

(30) Foreign Application Priority Data

Aug. 26, 2011   (CN) .......................... 2011 1 0249305

(51) Int. Cl.
*H04W 16/14*    (2009.01)
*H04W 24/10*    (2009.01)
(Continued)

(52) U.S. Cl.
CPC ............ *H04W 16/14* (2013.01); *H04L 5/0037* (2013.01); *H04L 27/0006* (2013.01);
(Continued)

(58) Field of Classification Search
None
See application file for complete search history.

(56) References Cited

U.S. PATENT DOCUMENTS

| | | | |
|---|---|---|---|
| 2010/0309317 A1 | 12/2010 | Wu et al. | |
| 2011/0176644 A1 | 7/2011 | Sadek | |
| 2012/0094681 A1* | 4/2012 | Freda ................... | H04W 72/02 455/452.1 |

FOREIGN PATENT DOCUMENTS

| | | |
|---|---|---|
| CN | 1859600 A | 11/2006 |
| CN | 101720112 A | 6/2010 |

(Continued)

OTHER PUBLICATIONS

English Translation of the Written Opinion of the International Search Authority in international application No. PCT/CN2012/077856, mailed on Oct. 18, 2012. (6 pages—see entire document).

(Continued)

*Primary Examiner* — Ashley Shivers
(74) *Attorney, Agent, or Firm* — Oppedahl Patent Law Firm LLC

(57) ABSTRACT

A spectrum resource reconfiguration method is disclosed. The method includes: after spectrum resource configuration is triggered, a spectrum resource configuration decision is generated, and spectrum resources are configured to a to-be-configured link according to the configuration decision. Also disclosed are a spectrum resource reconfiguration device and system for implementing the method. In the disclosure, a spectrum resource Database (DB) is set and stores currently available spectrum resources and used spectrum resources. In this way, when insufficient spectrum resources occur on some links or spectrum resources are unavailable, a system may configure corresponding spectrum resources to the links according to currently available spectrum resources, so that it is ensured that the links with insufficient spectrum resources have available resources, thereby ensuring development of as many services as possible. By means of the technical solution of the disclosure, the use of spectrum resources is more reasonable, all spectrum resources may be fully utilized instead of being limited to specific spectrum resources, thereby maximally utilizing the spectrum resources.

15 Claims, 6 Drawing Sheets

(51) Int. Cl.
　　　H04W 72/08　　　(2009.01)
　　　H04L 5/00　　　　(2006.01)
　　　H04W 24/08　　　(2009.01)
　　　H04W 28/16　　　(2009.01)
　　　H04L 27/00　　　 (2006.01)
　　　H04W 92/04　　　(2009.01)
(52) U.S. Cl.
　　　CPC ........... *H04W 24/08* (2013.01); *H04W 24/10* (2013.01); *H04W 28/16* (2013.01); *H04W 72/085* (2013.01); *H04L 5/003* (2013.01); *H04W 92/045* (2013.01)

(56) References Cited

FOREIGN PATENT DOCUMENTS

| CN | 102158970 A | 8/2011 |
|---|---|---|
| WO | 2010139057 A1 | 12/2010 |
| WO | 2011091250 A1 | 7/2011 |

OTHER PUBLICATIONS

International Search Report in international application No. PCT/CN2012/077856, mailed on Oct. 18, 2012. (2 pages—see entire document).

Use Cases for Operation in White Space Frequency Bands, mailed on Aug. 8, 2011.

Supplementary European Search Report in European application No. 12828163.1, mailed on Mar. 23, 2015.

\* cited by examiner

SPECTRUM RESOURCE RECONFIGURATION METHOD, DEVICE, AND SYSTEM

TECHNICAL FIELD

The disclosure relates to spectrum resource reconfiguration technology, and particularly to a spectrum resource reconfiguration method, device and system.

BACKGROUND

With the continuous progress of radio technology, various radio services are emerging massively while spectrum resources supporting radio services are limited. Currently, spectrum resources, which are extremely insufficient, are utilized inefficiently under a traditional fixed spectrum configuration mode. In a certain sense, such a configuration system which fixedly configures spectrum resources to an authorization system leads to the insufficiency of spectrum resources. However, Cognitive Radio (CR) technology breaks through such a traditional fixed spectrum configuration system to improve the utilization efficiency of spectrums through dynamically configuring the spectrums among systems.

With the constant increase in people's daily communication demands, simple voice data communication is no longer satisfactory. Video stream media services are accounting for an increasing proportion in people's communication life, which needs to be supported by larger bandwidths. Spectrums of International Mobile Telecom (IMT) systems are unprecedentedly insufficient. However, spectrum resources of broadcast Television (TV) systems, which are in low utilization, are available to a large extent but cannot be used by IMT systems. An IMT system acquires information of a broadcast TV system through the CR technology to seek opportunities to occupy TV White Spaces (TVWS) in time and space of the broadcast TV system, thus improving the utilization rate of this part of spectrums to greatly alleviate the insufficiency of spectrums of the IMT systems while avoiding interference to a main system through technologies including reliable power control, and an incumbent user discovery mechanism and the like.

At present, relay technology, which is popular in Long Term Evolution (LTE) technology or LTE-advanced (LTE-A) technology, still has unavoidable resource insufficiency. A new link is added because of the introduction of a relay node, namely, a backhaul link between the relay node and an Evolved Node B (eNB) is added. The backhaul link may be wireless in LTE/LTE-A, for example, when applied in a remote area, coverage of a temporary hotspot, a disaster relief period, and an access node in a nomadic state. In these scenarios, since deployment of wire connections is high in cost, or the positions of wire connections cannot be estimated to implement wire coverage in advance, or because of interruption of wire communication, effective coverage can be hardly implemented through wire connections. However, radio links can provide services rapidly. Thus, frequency resources need to be configured to backhaul links of this part to implement wireless connections.

In the scenarios above, for resource configuration of radio backhaul links, it is still basically considered, as specified in the spectrum management organization, that a part of authorized spectrum resources are configured to radio backhaul links of an LTE/LTE-A system at present. Since every operator finally acquires very limited spectrums applied to running of the LTE/LTE-A system, such a method of configuring a part of resources to radio backhaul links will inevitably have a great impact on capacity and quality of service of an access link. Although loss caused by insufficiency in spectrum resources may be reduced as much as possible through strict definitions of physical layers and higher layer protocols, such loss is inevitable. After the CR technology is introduced, appropriate WS resource (such as TVWS) may be found for a backhaul link so that the backhaul link does not need to share authorized spectrum resources of an access link.

FIG. 1 is a schematic diagram illustrating a logic structure of a CR system of a TVWS frequency band. As shown in FIG. 1, there are several application scenarios in related research, such as establishment of an intermediate or long distance radio access link by using TVWS resource, establishment of a short-distance radio access link by using TVWS resource, an application of an Ad-hoc network on a TVWS, an application of a Multimedia Broadcast Multicast Service (MBMS) on a TVWS, and an application of a backhaul link on a TVWS. In these scenarios, a node making a decision on resource reconfiguration is a Central Control Point (CCP) which is mainly configured to make a decision on spectrum resource reconfiguration, including: coordinating and configuring acquired WS resources of an incumbent user from a Data Base (DB) to each eNB, and controlling each eNB to perform reconfiguration. The DB here includes information of spectrum use condition of the incumbent user. However, in related technologies, reconfiguration of CR technology of a TVWS frequency band is not determined on the whole, and there is no division of stages in an overall process and no definition of functions of each stage. In other words, the CR technology of the TVWS frequency band is still in discussion at present, and there is no proven technique which may be utilized or referred to.

SUMMARY

In view of this, the disclosure is intended to provide a spectrum resource reconfiguration method, a spectrum resource reconfiguration device and a spectrum resource reconfiguration system, which are capable of fully utilizing various radio spectrum resources in a system and adequately ensuring resource configuration in a radio communication system.

To this end, a technical solution of the disclosure is implemented as follows.

A spectrum resource reconfiguration method includes:

after a reconfiguration system triggers spectrum resource reconfiguration, the reconfiguration system generates a spectrum resource reconfiguration decision, and configures spectrum resources to a to-be-configured link according to the reconfiguration decision.

Preferably, the method may further include:

information required by the spectrum resource reconfiguration decision is acquired, wherein the information required by the spectrum resource reconfiguration decision includes at least one of the followings:

currently available spectrum resources, load information of the to-be-configured link, information of currently occupied spectrum resources, quality of service status information, and information of each user.

Preferably, the reconfiguration system triggering the spectrum resource reconfiguration may include:

the reconfiguration system determines whether to perform the spectrum resource reconfiguration, according to incumbent user information acquired from a Data Base (DB), or reconfiguration information of a reconfiguration system in a neighbouring area, or a spectrum sensing and measurement result or spectrum resource reconfiguration request information of a subordinate node.

Preferably, the reconfiguration system triggers the spectrum resource reconfiguration when the configured spectrum resources are reoccupied by an incumbent user, or when resource reconfiguration of a neighbouring area interfere with the reconfiguration system, or when a spectrum resource request of a subordinate network node is received.

Preferably, the step that the spectrum resource reconfiguration decision is generated may include:

the reconfiguration system generates reconfiguration decisions according to different reconfiguration trigger events, including:

spectrum resource is configured for a network node sending a spectrum resource request; or a designated spectrum being used is stopped to be used when an incumbent user reoccupies a spectrum resource; or when an incumbent user reoccupies a spectrum resource, a designated spectrum being used is stopped to be used and the spectrum resource reconfiguration is performed; or the spectrum resource reconfiguration is performed and interference between neighbouring network nodes is coordinated; or spectrum resource optimization reconfiguration is performed according to a priority of a network node.

Preferably, the method may further include:

configured spectrums of a link are sensed and measured, and the spectrum resource reconfiguration decision is adjusted according to an acquired sensing and measurement result, and the spectrum resources are reconfigured to the to-be-configured link according to the adjusted spectrum resource reconfiguration decision.

Preferably, the step that the spectrum resource reconfiguration decision is adjusted according to the acquired sensing and measurement result may include:

when it is determined that unexpected interference exists in the link configured with the spectrum resources, interference source coordination is performed or new spectrum resources are reconfigured; or when it is determined that a spectrum resource configuration coverage of the reconfiguration system is within a guard band of an incumbent user, transmission power is reduced or new spectrum resources are reconfigured.

Preferably, the method may further include:

after the spectrum resources are configured to the to-be-configured link according to the spectrum resource configuration decision the to-be-configured link, a feedback on resource reconfiguration completion conditions is received from a network node of the to-be-configured link, and reconfiguration data are updated.

Preferably, the method may further include:

after the reconfiguration system completes reconfiguration acknowledgement, a related node monitors overall system performance, including:

reconfiguration systems triggering reconfiguration and/or participating in reconfiguration monitor system performance in respective control ranges of the reconfiguration systems triggering reconfiguration and/or participating in reconfiguration; and/or a DB monitors performance of an incumbent user system;

wherein indexes of the performance monitoring include at least one of the followings:

user throughput, a spectrum efficiency, a coverage rate, mobility management feature indexes, and quality indexes;

wherein the mobility management feature indexes include a switchover success rate and/or switchover delay, and the quality indexes include at least one of the followings: a service download speed, service call delay and voice quality.

A spectrum resource reconfiguration device includes: a trigger unit, a decision unit and a configuration unit, wherein the trigger unit is configured to trigger spectrum resource reconfiguration;

the decision unit is configured to generate a spectrum resource reconfiguration decision; and the configuration unit is configured to configure spectrum resources to a to-be-configured link according to the reconfiguration decision.

Preferably, the spectrum resource reconfiguration device may further include:

an acquisition unit configured to acquire information required by the spectrum resource reconfiguration decision, wherein the information required by the spectrum resource reconfiguration decision includes at least one of the followings:

currently available spectrum resources, load information of the to-be-configured link, information of currently occupied spectrum resources, quality of service status information, and information of each user.

Preferably, the trigger unit may be configured to determine whether to perform the spectrum resource reconfiguration, according to incumbent user information acquired from a DB, or reconfiguration information of a reconfiguration system in a neighbouring area, or a spectrum sensing and measurement result or spectrum resource reconfiguration request information of a subordinate node.

Preferably, the trigger unit may be further configured to trigger the spectrum resource reconfiguration when the configured spectrum resources are reoccupied by an incumbent user, or when resource reconfiguration of a neighbouring area interfere with the reconfiguration system, or when a spectrum resource request of a subordinate network node is received.

Preferably, the device may further include a measurement unit and an adjustment unit, wherein the measurement unit is configured to sense and measure configured spectrums of a link;

the adjustment unit is configured to adjust the spectrum resource reconfiguration decision according to an acquired sensing and measurement result; and the configuration unit is further configured to reconfigure the spectrum resources to the to-be-configured link according to the adjusted reconfiguration decision.

Preferably, the adjustment unit may be further configured to, when it is determined that unexpected interference exists in the link configured with the spectrum resources, perform interference source coordination or reconfigure new spectrum resources; and when it is determined that a spectrum resource configuration coverage is within a guard band of an incumbent user, reduce transmission power, or reconfigure new spectrum resources.

Preferably, the device may further include:

a completion unit configured to feed back a spectrum resource configuration result after the spectrum resource configuration of the link is completed, and update spectrum resource configuration data.

Preferably, the device may further include:

a monitoring unit configured to perform performance monitoring on the link configured with the spectrum resources, including: reconfiguration systems triggering reconfiguration and/or participating in reconfiguration monitor system performances in respective control ranges of the reconfiguration systems triggering reconfiguration and/or participating in reconfiguration, and/or a DB monitors performance of an incumbent user system;

wherein monitored indexes include at least one of the followings:

user throughput, a spectrum efficiency, a coverage rate, mobility management feature indexes, and quality indexes;

wherein the mobility management feature indexes include a switchover success rate and/or switchover delay, and the quality indexes include at least one of the followings: a service download speed, service call delay and voice quality.

A spectrum resource reconfiguration system includes a DB, a Central Control Point (CCP) and a Reconfiguration ENB (RBS), wherein the DB is configured to store spectrum resource status information of a main system and information of WS resources of the main system used by the CCP;

the CCP is connected with the DB, and is configured to: collect WS resource requests from the RBS, send a WS resource configuration request to the DB; coordinate and configure acquired WS resources to the RBS; receive a spectrum resource reconfiguration command from the DB, and control the RBS to perform corresponding spectrum resource reconfiguration; feed back a configuration update message to the DB; and send a sensing and measurement configuration message to the RBS, and feed a sensing and measurement result back to the DB; and the RBS is connected with the CCP, and is configured to configure WS resources indicated by the CCP to each radio link, change or adjust a wireless communication parameter according to an indication of the CCP and perform spectrum sensing and measurement.

The spectrum status information of the main system may include at least one of the followings: information of spectrum resources being used, information of unused spectrum resources and information of prohibited spectrum resources;

wherein the information of the spectrum resources being used includes at least one of the followings: frequency points, bandwidths, possible durations, coverage and isolation bands;

the information of the unused spectrum resources includes at least one of the followings: frequency points, working bandwidths, coverage, possible durations and maximum allowed transmission power;

the information of the prohibited spectrum resources includes at least one of the followings: frequency points, and working bandwidths; and the information of the WS resources of the main system used by the CCP includes at least one of the followings:

a frequency point and a bandwidth of a WS used by the CCP, and the location of the CCP using the WS.

In the disclosure, a spectrum resource DB is set and stores currently available spectrum resources and used spectrum resources. In this way, when insufficient spectrum resources occur on some links or spectrum resources are unavailable, a system may configure corresponding spectrum resources to the links according to currently available spectrum resources, so that it is ensured that the links with insufficient spectrum resources have available resources, thereby ensuring development of as many services as possible. By means of the technical solution of the disclosure, the use of the spectrum resources is more reasonable, all spectrum resources may be fully utilized instead of being limited to specific spectrum resources, thereby maximally utilizing spectrum resources.

DETAILED DESCRIPTION

To make the purposes, technical solution and advantages of the disclosure clear and easy to understand, the disclosure will be further elaborated below by illustrating embodiments and with reference to the drawings.

Figure 1:
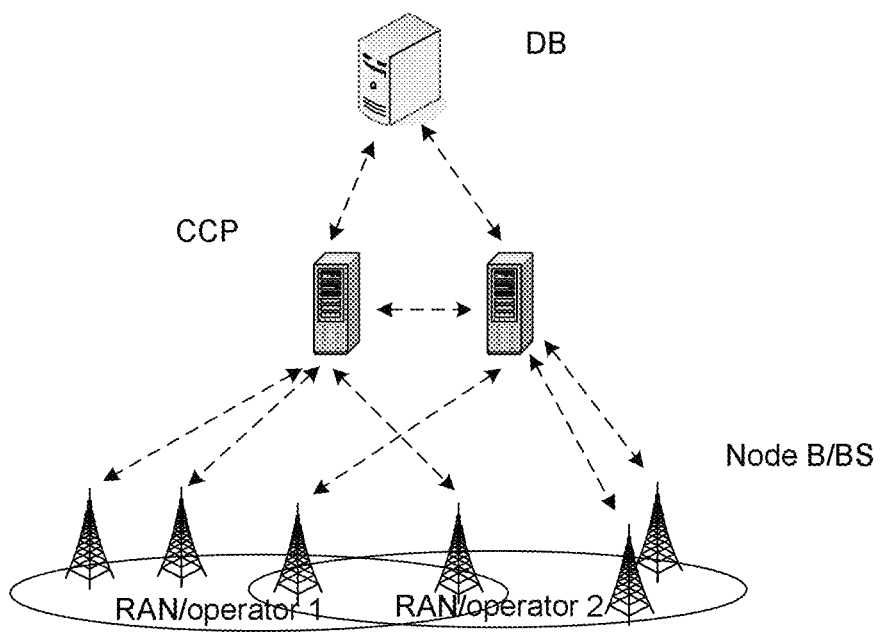
FIG. 1 is a schematic diagram illustrating a logic structure of a CR system of a TVWS frequency band.

A spectrum resource reconfiguration system of the disclosure may be understood with reference to a structure as shown in FIG. 1. As shown in FIG. 1, the spectrum resource reconfiguration system of the disclosure includes a Data Base (DB), a Central Control Point (CCP) and a Reconfiguration Base Station (RBS).

The DB may be provided by a main system operator or a third party; the DB includes use information of main system spectrum resources and information of WS resources of the main system used by the CCP. At the same time, the DB further stores management domain policy information. The DB mainly stores main system spectrum status information, including information of spectrum resource being used, information of unused spectrum resources, and information of prohibited spectrum resources (which may be management domain restricted spectrums, or operator reserved spectrums, or the like). The information of the spectrum resources being used includes but is not limited to: frequency points, bandwidths, possible durations, coverage and isolation bands. The information of the unused spectrum resources includes but is not limited to: frequency points, working bandwidths, coverage, possible durations and maximum allowed transmission power. The information of the prohibited spectrum resources includes but is not limited to: frequency points and working bandwidths. The information of the WS resources of the main system used by each CCP includes: a WS used by the CCP, and the location of the CCP. The DB is responsible for providing information of the main system WS resources for each CCP.

The CCP, which represents a CCP of a system or an operator, may be fixedly connected with the DB, or may be also connected with the DB in a mobile manner. The CCP at least includes the following functions: 1. collecting WS resource requests from all RBSs, and sending a WS resource configuration request to the DB; 2. including spectrum resource use information of each subordinate RBS, and coordinating and configuring acquired WS resources to subordinate RBSs; 3. receiving a reconfiguration command from the DB and controlling a subordinate RBS to perform corresponding reconfiguration; 4. feeding back a configuration update message to the DB, including reconfiguration information update after WS resource acquisition and configuration update after a WS is stopped to be used; 5. sending, to a RBS, a sensing and measurement configuration message which includes intra-frequency or adjacent-frequency system information of configured WSs, a sensing and measurement threshold and the like; and 6. feeding back a sensing and measurement result to the DB.

The RBS may be directly connected with the CCP, and functions of the RBS include but are not limited to: 1. configuring acquired WS resources to all radio links connected with the RBS; 2. changing or adjusting a parameter of radio communication technology, such as a modulation types and/or transmission power; 3. managing and maintaining working spectrums, such as working frequency points and frequency bands; 4. taking charge of communicating with the CCP; 5. a spectrum sensing and measurement function; and 6. sensing and measuring data processing capacity.

A reconfiguration system triggers spectrum resource reconfiguration. The CCP acquires information required by a reconfiguration decision, runs a reconfiguration algorithm, generates a reconfiguration decision and sends a reconfiguration command to a corresponding eNB. The eNB cooperates with a subordinate node thereof having the sensing and measurement function to perform spectrum sensing on designated spectrum resource. If unexpected interference exists or the spectrum is within an incumbent user guard band, a sensing and measurement result is fed back to an upper layer node; otherwise, the eNB and the subordinate node thereof execute the reconfiguration command. After the reconfiguration is completed, the eNB feeds back reconfiguration execution conditions to upper layers one by one, and a related node monitors reconfiguration performance.

Figure 2:
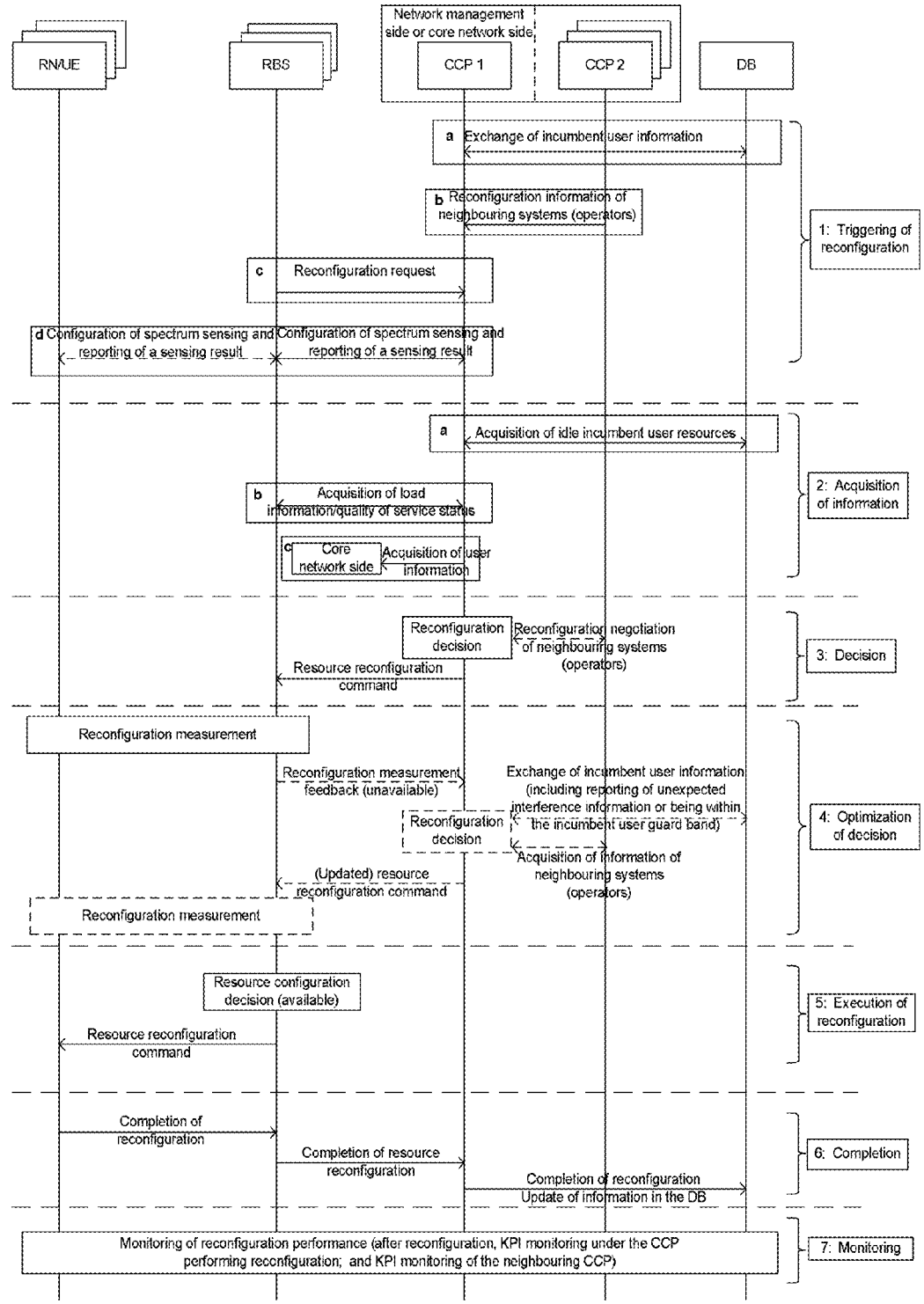
FIG. 2 is a flowchart of a spectrum resource reconfiguration method of the disclosure.

FIG. 2 is a flowchart of a spectrum resource reconfiguration method of the disclosure. As shown in FIG. 2, an overall implementation process of spectrum resource reconfiguration of the disclosure includes one or more steps as follows: Step 1, triggering of reconfiguration; Step 2: acquisition of information; Step 3: reconfiguration decision; Step 4: optimization of decision; Step 5: execution of reconfiguration; Step 6: completion of reconfiguration; and Step 7: performance monitoring. It should be noted that all the above steps are merely processing steps set according to information interaction processes, and may be combined as required, for example, the step of triggering of reconfiguration is combined with the step of acquisition of information to form a step of reconfiguration triggering and information acquisition. The combination is not limited to the manner above. The above steps are introduced respectively as follows.

Step 1: Triggering of reconfiguration: A reconfiguration system triggers spectrum resource reconfiguration.

Preferably, the several triggering method as follows are applied: a CCP learns that an incumbent user on a main system spectrum occupied by the CCP in an incumbent user DB appears; reconfiguration of the current CCP is triggered by reconfiguration of a CCP in a neighbouring area; the CCP receives a spectrum resource request of a subordinate node of the CCP; and a sensing and measurement result of the subordinate node indicates that an incumbent user on a main system spectrum occupied by the subordinate node appears.

Step 2: Acquisition of information: The CCP acquires information required by a reconfiguration decision.

Information that needs to be acquired includes but is not limited to: TVWS resource information, load status information and/or quality of service status information of each subordinate base station, and related information of users under each RBS.

Specifically, the TVWS resource information is used to configure acquired TVWS resources to a corresponding base station in the reconfiguration decision.

specifically, the load status information and/or quality of service status information of each subordinate base station of the CCP is/are used to measure demands on TVWS resources of each subordinate base station and make considerations in the reconfiguration decision. If spectrum resources of a RBS1 are insufficient, a spectrum resource request is sent. A RBS2 under the same CCP has acquired TVWS resources previously, but load status information reported by the RBS2 indicates that the RBS2 is in a light-load state. Thus, the CCP may reconfigure part of TVWS resources of the RBS2 to the RBS1, so as to implement spectrum resource optimization among base stations.

Specifically, the related information of users under each RBS, such as information the number of users and user ratings, is used to measure priorities of subordinate RBSs, and make considerations in the reconfiguration decision. For example, the RBS1 and the RBS2 under the CCP apply for TVWS resources at the same time, but resources successfully applied by the CCP can only satisfy the demand of one of the RBS1 and the RBS2, the priorities of the RBS1 and the RBS2 need to be considered at the moment. For example, the number of users with high priorities under the RBS1 accounts for an proportion of 60% among all users while the number of users with high priorities under the RBS2 accounts for an proportion of 30% among all users, thus the priority of the RBS1 is higher than that of the RBS2, and the CCP configures the TVWS resources to the RBS1.

Step 3: Reconfiguration decision: The CCP runs a reconfiguration algorithm according to a triggering reason and acquired information, generates a reconfiguration decision and negotiates with a neighbouring CCP.

The CCP runs corresponding reconfiguration algorithms according to different reconfiguration triggering reasons, and generates reconfiguration decisions. For example, in the case that an incumbent user appears, the CCP releases spectrum resources on a band where the incumbent user appears. When a subordinate RBS requests for TVWS resources, the CCP configures acquired TVWS resources to a link under a target RBS. When the subordinate RBS requests for TVWS resources but TVWS resources are insufficient and there are no new TVWS resources, the CCP optimizes spectrum resources among subordinate base stations of the CCP and negotiates with a neighbouring CCP about the reconfiguration decision.

Step 4: Optimization of decision: The CCP forms the generated spectrum reconfiguration decision into a command and sends the command to a base station. The base station cooperates with a subordinate node thereof having the sensing and measurement function to sense and measure a target TVWS, and feeds back a sensing and measurement result to an upper layer so that the upper layer node can optimize the spectrum resource reconfiguration decision generated by the CCP.

A frequency band that needs to be sensed is designated reconfigured TVWS resource, and it is determined whether there is unexpected interference or it is determined, according to designated transmission power, whether the frequency band is within an incumbent user guard band. If there is interference, measurement report information, including an interference signal, an interfered frequency band, and position and area information, is fed back to the upper layer node (including the CCP and the DB). The upper layer node coordinates a related interference source, or reconfigures new resources. If the frequency band is within the incumbent user guard band, incumbent user signal power detected by the base station is indicated in the measurement report information fed back to the upper layer, and the upper layer node determines to reduce the transmission power of a cognitive user or reconfigures new resources. The step will be performed repeatedly until the sensing and measurement result indicates that the interference is acceptable and is not within the range of the incumbent user guard band.

Step 5: Reconfiguration decision: The CCP forms the reconfiguration decision into a reconfiguration command and sends the reconfiguration command to a RBS which requires reconfiguration. The RBS performs specific resource reconfiguration control, including: configuring acquired TVWS resource to a designated link, and specifying configuration parameters, such as designated RBS subordinate reconfiguration time, TVWS frequency points and bandwidths.

Step 6: Completion of reconfiguration: After acquiring information of new resource, a terminal in a connected state measures new spectrum resource, and feeds back reconfiguration completion acknowledgement layer by layer after completing reconfiguration. The CCP and the DB update spectrum resource configuration information to facilitate subsequent TVWS resource configuration.

Step 7: Performance monitoring: After the step of completion of reconfiguration, the base station and subordinate nodes thereof complete reconfiguration acknowledgement finally, and then a related node needs to monitor the overall system performance. For example, a RBS needs to monitor performance within the coverage thereof, CCPs triggering reconfiguration and participating in reconfiguration need to monitor system performance within their respective control range, and the DB monitors performance indexes of the incumbent user system.

Indexes that need to be monitored include but are not limited to: user throughput, a spectrum efficiency, a coverage rate, mobility management feature indexes (such as a switchover success rate and switchover delay), quality indexes (such as a Packet Switching (PS) service download speed, service call delay and voice quality).

It should be noted that the process above is the optimal process for implementing the spectrum resource reconfiguration method of the disclosure, but is not the most basic steps for implementing the spectrum resource reconfiguration method of the disclosure.

Embodiment 1

Figure 3:
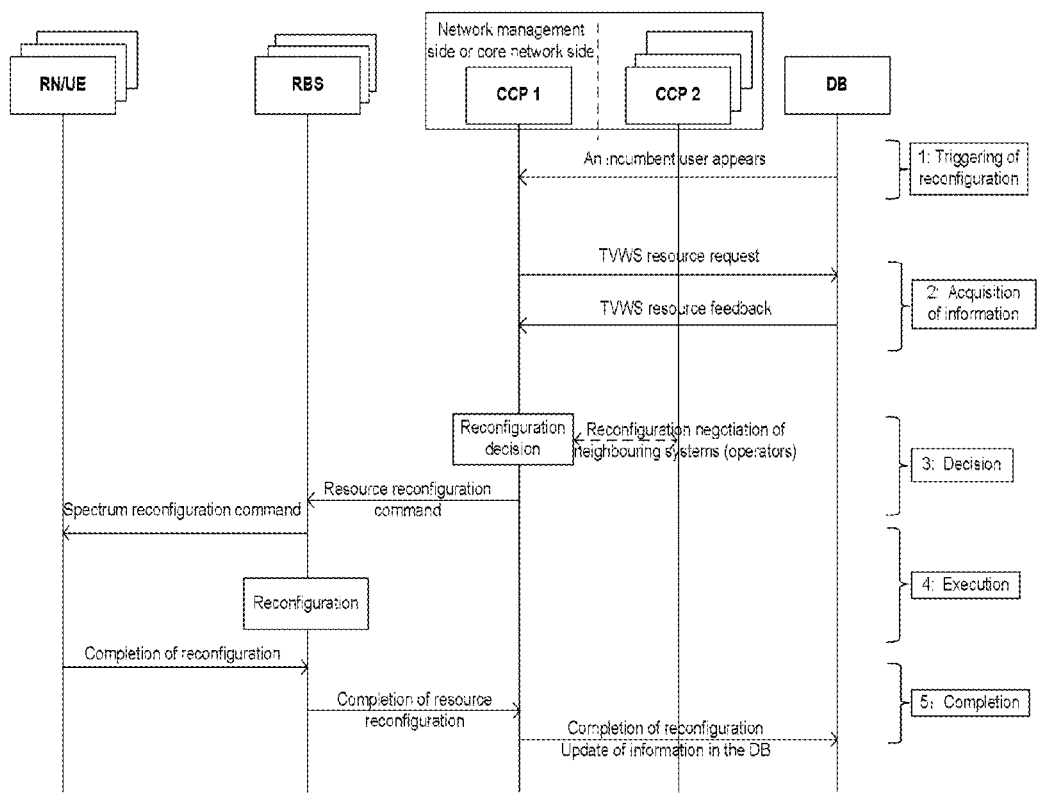
FIG. 3 is a flowchart of a spectrum resource reconfiguration of the first embodiment of the disclosure.

FIG. 3 is a flowchart of a spectrum resource reconfiguration of the first embodiment of the disclosure. As shown in FIG. 3, the spectrum resource reconfiguration of the embodiment includes the following steps: triggering of reconfiguration, acquisition of information, decision of reconfiguration, and execution of reconfiguration, which will be elaborated below.

Step 1: Triggering of reconfiguration: A DB notifies a CCP that an incumbent user of a spectrum f1 appears in an area where the CCP is located, orders all links established on the spectrum resource f1 under the CCP to switch to other spectrums, and triggers the CCP to generate a spectrum resource reconfiguration decision.

Step 2: Acquisition of information: Since the links using the spectrum resource f1 under the CCP need to switch to new spectrum resources, the CCP accesses the DB, and sends a TVWS resource request to the DB. The DB feeds back information of current TVWS resources to the CCP, and the information at least includes: a TVWS frequency point (such as f2), a bandwidth (6 MHz), and transmission parameter limitations thereon (such as maximum transmission power 100 W and an antenna pattern).

Step 3: Decision of reconfiguration: The CCP runs a reconfiguration algorithm. In this scenario, the CCP decides to configure acquired TVWS resource f2 to a RBS which needs reconfiguration, and forwards transmission parameter limitation information from the DB. After generating the reconfiguration decision, the CCP sends information of the reconfiguration decision to a neighbouring CCP2, and negotiates with the neighbouring CCP2 to determine whether interference exists. If there is no interference with the CCP2, then the reconfiguration decision becomes a final decision. If interference exists, the CCP further needs to negotiate with the CCP2. The CCP finds out, according to TVWS resource utilization condition information stored in a subordinate RBS of the CCP, a RBS which is utilizing the spectrum f1, and sends a reconfiguration command to the RBS. The reconfiguration command includes the spectrum resource f1, out of which the RBS is ordered to stop to be used, the new TVWS resource f2 configured to the RBS, and limitation information of related transmission parameters.

Step 4: Execution of reconfiguration: After receiving the resource reconfiguration command, the RBS formulates a specific execution solution for the reconfiguration command, for example, subordinate nodes (such as User Equipment (UE)1, UE2, . . . , UE15) specifically involved in the reconfiguration, and reconfiguration time control: spectrum switchover from f1 to f2 is implemented within 2 seconds; the base station sends the spectrum reconfiguration command to a subordinate node needing reconfiguration and executes reconfiguration (i.e., spectrum resource switching) of the base station, and the subordinate node accesses to the new spectrum f2 according to the spectrum reconfiguration command.

Step 5: Completion of reconfiguration: After completing reconfiguration from f1 to f2, UE1, UE2, . . . , UE15 feed back reconfiguration completion acknowledgement to the RBS. The RBS collects feedback results of the subordinate UEs, and feeds back resource reconfiguration completion to the CCP1. The CCP1 updates spectrum resource configuration information, and sends a reconfiguration completion DB information update request to the DB. After receiving the resource reconfiguration completion sent by the CCP1, the DB updates information of use conditions of TVWS resources.

Embodiment 2

Figure 4:
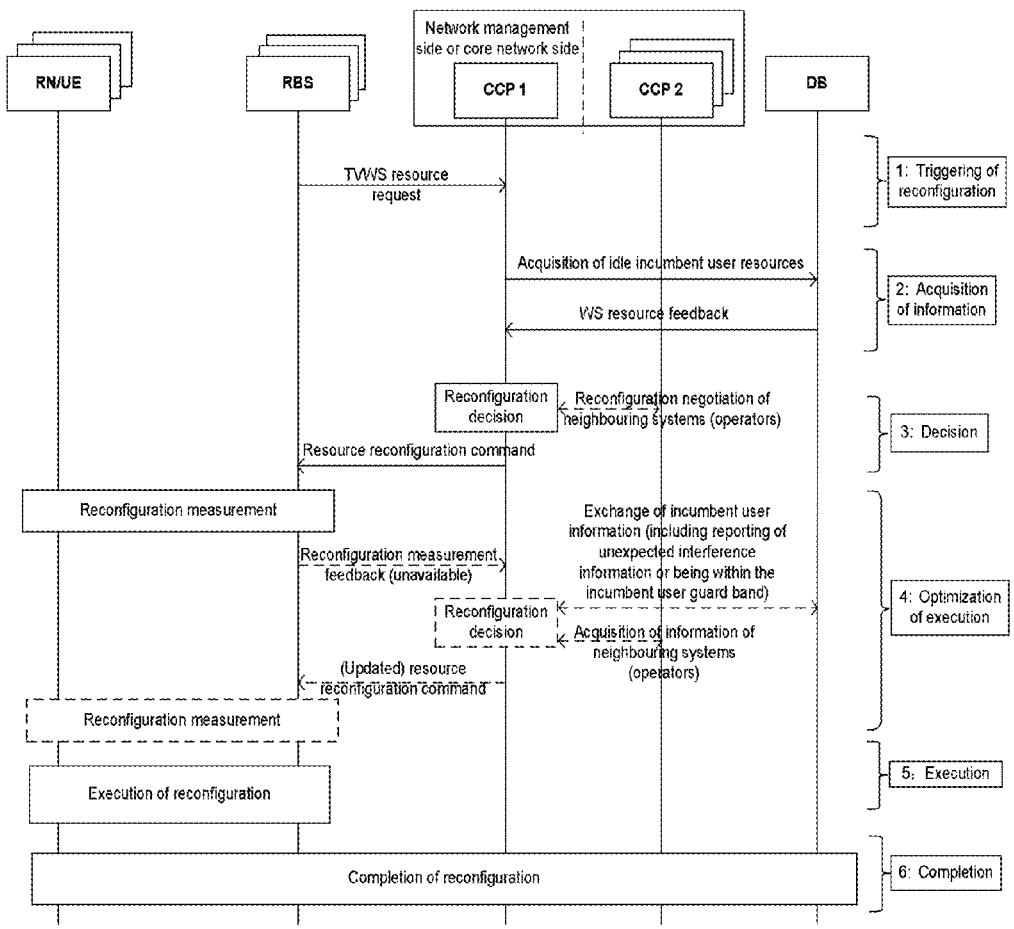
FIG. 4 is a flowchart of a spectrum resource reconfiguration of the second embodiment of the disclosure.

FIG. 4 is a flowchart of a spectrum resource reconfiguration of the second embodiment of the disclosure. As shown in FIG. 4, the spectrum resource reconfiguration of the embodiment includes the following steps: triggering of reconfiguration, acquisition of information, decision of reconfiguration, optimization of decision, execution of reconfiguration, and completion of reconfiguration.

Step 1: Triggering of reconfiguration: A CCP receives a spectrum resource request of a subordinate node, if the current load of a RBS is relatively heavy and the quantity of services exceeding a preset threshold value accounts for 90% of the system capacity, a TVWS resource request sent by the RBS to the CCP is triggered.

Step 2: Acquisition of information: The CCP accesses a DB, and sends a TVWS resource request to the DB. The DB feeds back information of current TVWS resources to a CCP1, and the information at least includes: a TVWS frequency point (such as f1), a bandwidth (6 MHz), and transmission parameter limitations thereon (such as maximum transmission power 100 W and an antenna pattern).

Step 3: Decision of reconfiguration: The CCP runs a reconfiguration algorithm; in this scenario, the CCP decides to configure acquired TVWS resource f1 to a RBS which needs reconfiguration, and forwards transmission parameter limitation information from the DB. After generating a reconfiguration decision, the CCP1 sends information of the reconfiguration decision to a neighbouring CCP2, and negotiates with the neighbouring CCP2 to determine whether interference exists. If there is no interference with the CCP2, then the reconfiguration decision becomes a final decision. If interference exists, the CCP1 further needs to negotiate with the CCP2.

Step 4: Optimization of decision: The CCP forms the generated spectrum reconfiguration decision into a command, and sends the command to a base station. The RBS cooperates with a subordinate node thereof having the sensing and measurement function to sense and measure the target TVWS f1. If it is detected that interference power higher than a preset threshold value V exists on f1, the RBS feeds back a sensing and measurement result to an upper layer to indicate the CCP1 that unexpected interference exists on the configured f1, the CCP1 then feeds back the sensing and measurement result to the DB. After receiving the sensing and measurement result, the DB reconfigures new TVWS resource f2 to the CCP1. If there is always unexpected interference on frequency f1 for the CCP1, the DB stores such a statistical law as reference for a subsequent reconfiguration decision, and no longer configures the spectrum resource f1 to the CCP1. After the CCP1 acquires the reconfigured TVWS resource f2, the process of optimization of decision of Step 4 is repeated until there is no unexpected interference on a configured spectrum resource.

Step 5: Execution of reconfiguration: After receiving the resource reconfiguration command, the RBS formulates a specific execution solution for the reconfiguration command, for example, subordinate nodes (such as UE1, UE2, . . . , UE15) specifically involved in the reconfiguration, and reconfiguration time control: spectrum switchover from f1 to f2 is implemented within 2 seconds; at the same time, for a subsequently accessed UE, the RBS will access the UE on the acquired spectrum f2 preferentially.

Step 6: Completion of reconfiguration: After completing reconfiguration from f1 to f2, UE1, UE2, . . . , UE15 feed back reconfiguration completion acknowledgement to the RBS. The RBS collects feedback results of the subordinate UEs, and feeds back resource reconfiguration completion to the CCP1. The CCP1 updates spectrum resource configuration information, and sends a reconfiguration completion DB information update request to the DB. After receiving the resource reconfiguration completion sent by the CCP1, the DB updates information of use conditions of TVWS resources.

Embodiment 3

Figure 5:
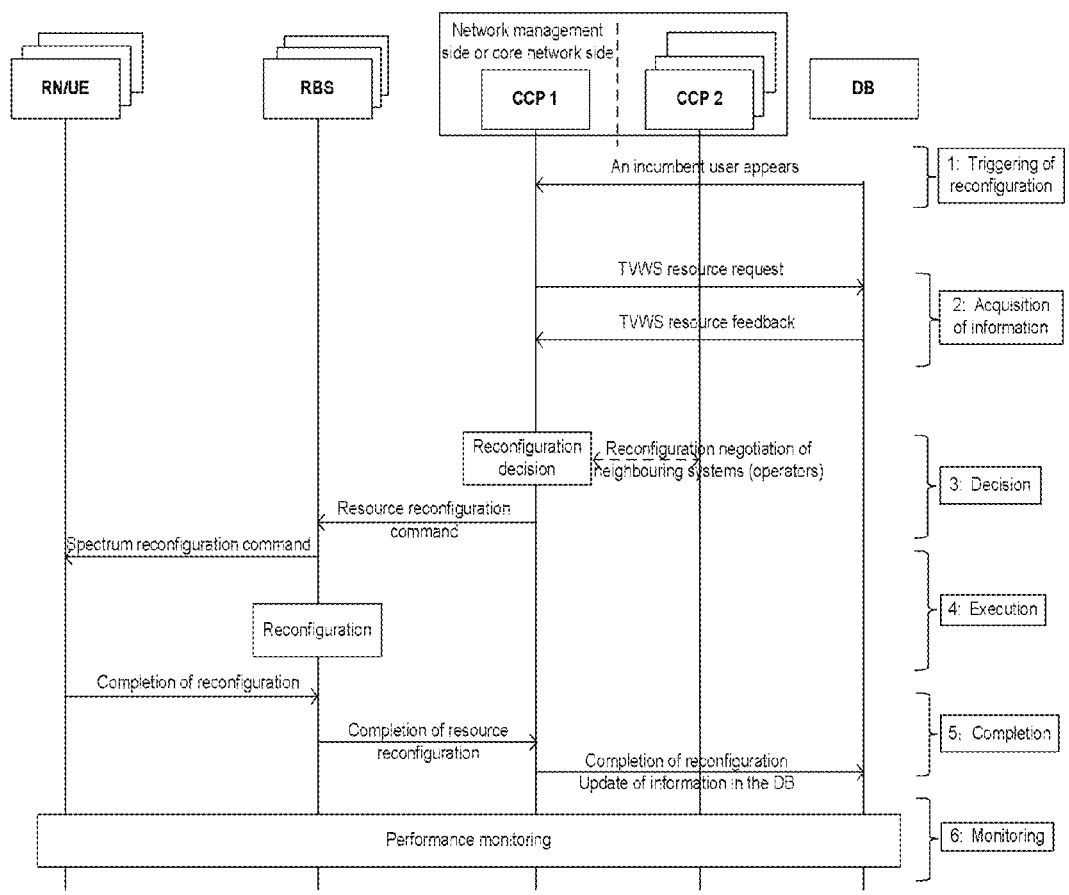
FIG. 5 is a flowchart of a spectrum resource reconfiguration of the third embodiment of the disclosure.

FIG. 5 is a flowchart of a spectrum resource reconfiguration of the third embodiment of the disclosure. As shown in FIG. 5, the spectrum resource reconfiguration of the present embodiment includes the following steps: triggering of reconfiguration, acquisition of information, decision of reconfiguration, execution of reconfiguration, completion of reconfiguration and performance monitoring.

Step 1: Triggering of reconfiguration: A DB notifies a CCP that an incumbent user of a spectrum f1 appears in an area where the CCP is located, orders all links established on the spectrum resource f1 under the CCP to switch to other spectrums, and triggers the CCP to generate a spectrum resource reconfiguration decision;

Step 2: Acquisition of information: Since the links using the spectrum resource f1 under the CCP need to switch to new spectrum resources, the CCP accesses the DB, and sends a TVWS resource request to the DB. The DB feeds back information of current TVWS resources to the CCP, and the information at least includes: a TVWS frequency point (such as f2), a bandwidth (6 MHz), and transmission parameter limitations thereon (such as maximum transmission power 100 W and an antenna pattern).

Step 3: Decision of reconfiguration: The CCP runs a reconfiguration algorithm. In this scenario, the CCP decides to configure acquired TVWS resource f2 to a RBS which needs reconfiguration, and forwards transmission parameter limitation information from the DB. After generating the reconfiguration decision, the CCP sends information of the reconfiguration decision to a neighbouring CCP2, and negotiates with the neighbouring CCP2 to determine whether interference exists. If there is no interference with the CCP2, then the reconfiguration decision becomes a final decision. If interference exists, the CCP further needs to negotiate with the CCP2. The CCP finds out, according to TVWS resource utilization condition information stored in a subordinate RBS of the CCP, a RBS which is utilizing the spectrum f1, and sends a reconfiguration command to the RBS. The reconfiguration command includes the spectrum resource f1, out of which the RBS is ordered to stop to be used, the new TVWS resource f2 configured to the RBS, and limitation information of related transmission parameters.

Step 4: Execution of reconfiguration: After receiving the resource reconfiguration command, the RBS formulates a specific execution solution for the reconfiguration command, for example, subordinate nodes (such as UE1, UE2, . . . , UE15) specifically involved in the reconfiguration, and reconfiguration time control: spectrum switchover from f1 to f2 is implemented within 2 seconds; the base station sends the spectrum reconfiguration command to a subordinate node needing reconfiguration and executes reconfiguration (i.e., spectrum resource switching) of the base station, and the subordinate node accesses to the new spectrum f2 according to the spectrum reconfiguration command.

Step 5: Completion of reconfiguration: After completing reconfiguration from f1 to f2, UE1, UE2, . . . , UE15 feed back reconfiguration completion acknowledgement to the RBS. The RBS collects feedback results of the subordinate UEs, and feeds back resource reconfiguration completion to the CCP1. The CCP1 updates spectrum resource configuration information and sends a reconfiguration completion DB information update request to the DB. After receiving the resource reconfiguration completion sent by the CCP1, the DB updates information of use conditions of TVWS resources.

Step 6: Performance monitoring: After completion of reconfiguration, the base station and subordinate nodes thereof complete reconfiguration acknowledgement finally, and then a related node needs to monitor the overall system performance. For example, a reconfiguration base station needs to monitor performance within the coverage of the reconfiguration base station. CCPs triggering reconfiguration and participating in reconfiguration need to monitor system performance within their respective control ranges. The DB monitors performance indexes of the incumbent user system, if a performance monitoring result indicates that the reconfiguration system performance fails to achieve an expected performance or serious interference is caused to the incumbent user system, reconfiguration rollback (i.e., returning to the status before the reconfiguration) is triggered or reconfiguration is triggered.

Indexes that need to be monitored include, but are not limited to: user throughput, a spectrum efficiency, a coverage rate, mobility management feature indexes (such as a switchover success rate and switchover delay), quality indexes (such as a PS service download speed, service call delay and voice quality).

Embodiment 4

Figure 6:
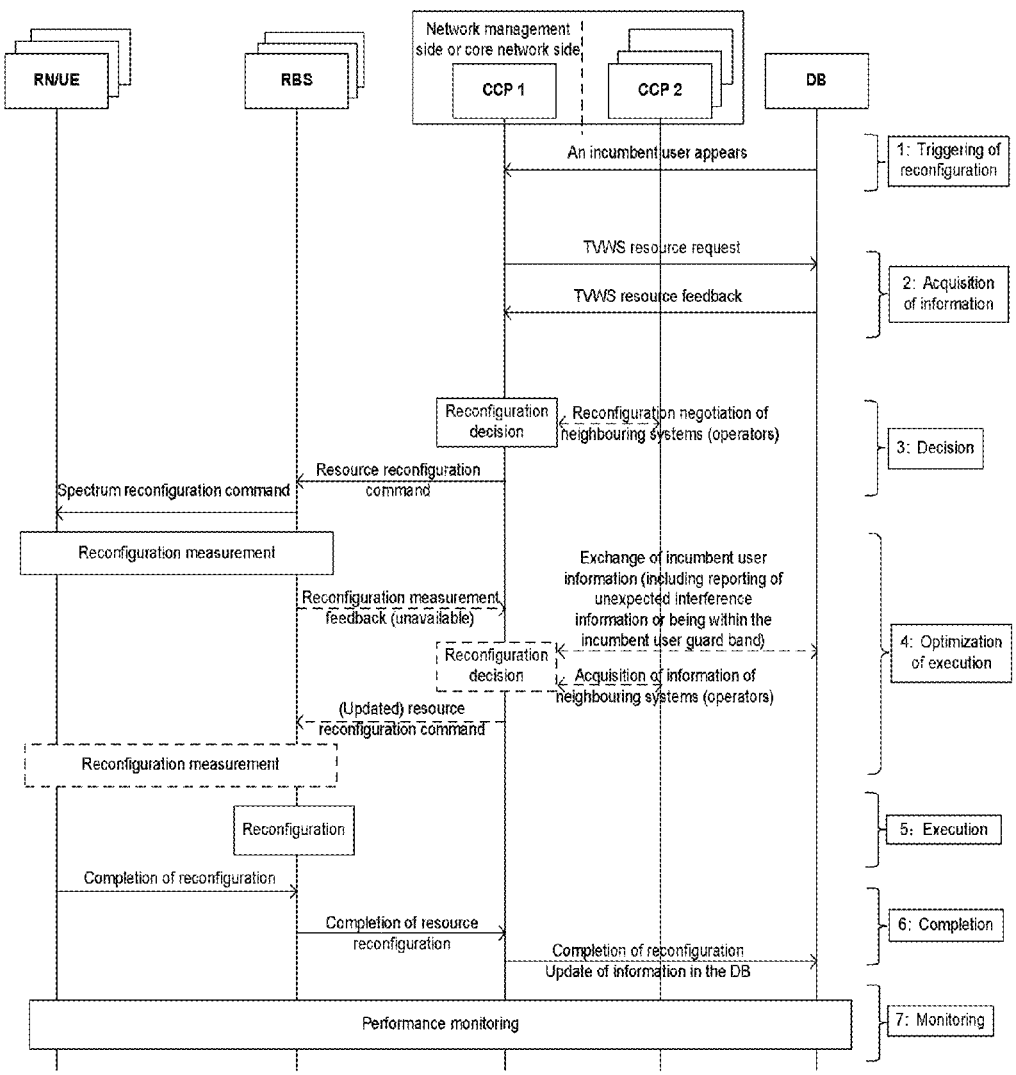
FIG. 6 is a flowchart of a spectrum resource reconfiguration of the fourth embodiment of the disclosure.

FIG. 6 is a flowchart of a spectrum resource reconfiguration of the fourth embodiment of the disclosure. As shown in FIG. 6, the spectrum resource reconfiguration of the present embodiment includes the following steps: triggering of reconfiguration, acquisition of information, decision of reconfiguration, optimization of decision, execution of reconfiguration, completion of reconfiguration and performance monitoring.

Step 1: Triggering of reconfiguration: A DB notifies a CCP that an incumbent user of a spectrum f1 appears in an area where the CCP is located, orders all links established on the spectrum resource f1 under the CCP to switch to other spectrums and triggers the CCP to generate a spectrum resource reconfiguration decision.

Step 2: Acquisition of information: Since the links using the spectrum resource f1 under the CCP need to switch to new spectrum resources, the CCP accesses the DB, and sends a TVWS resource request to the DB. The DB feeds back information of current TVWS resources to the CCP, and the information at least includes: a TVWS frequency point (such as f2), a bandwidth (6 MHz), and transmission parameter limitations thereon (such as maximum transmission power 100 W and an antenna pattern).

Step 3: Decision of reconfiguration: The CCP runs a reconfiguration algorithm. In this scenario, the CCP decides to configure acquired TVWS resource f2 to a RBS which needs reconfiguration, and forwards transmission parameter limitation information from the DB. After generating the reconfiguration decision, the CCP sends information of the reconfiguration decision to a neighbouring CCP2, and negotiates with the neighbouring CCP2 to determine whether interference exists. If there is no interference with the CCP2, then the reconfiguration decision becomes a final decision. If interference exists, the CCP further needs to negotiate with the CCP2. The CCP finds out, according to TVWS resource utilization condition information stored in a subordinate RBS of the CCP, a RBS which is utilizing the spectrum f1, and sends a reconfiguration command to the RBS. The reconfiguration command includes the spectrum resource f1, out of which the RBS is ordered to stop to be used, the new TVWS resource f2 configured to the RBS, and limitation information of related transmission parameters.

Step 4: Optimization of decision: The CCP forms the generated spectrum reconfiguration decision into a command and sends the command to a base station. The RBS cooperates with a subordinate node thereof having the sensing and measurement function to sense and measure the target TVWS f1. If it is detected that interference power higher than a preset threshold value V exists on f1, the RBS feeds back a sensing and measurement result to an upper layer to indicate the CCP1 that unexpected interference exists on the configured f1, the CCP1 then feeds back the sensing and measurement result to the DB. After receiving the sensing and measurement result, the DB reconfigures new TVWS resource f2 to the CCP1. If there is always unexpected interference on frequency f1 for the CCP1, the DB stores such a statistical law as reference for a subsequent reconfiguration decision, and no longer configures the spectrum resource f1 to the CCP1. After the CCP1 acquires the reconfigured TVWS resource f2, the process of optimization of decision of Step 4 is repeated until there is no unexpected interference on a configured spectrum resource.

Step 5: Execution of reconfiguration: After receiving the resource reconfiguration command, the RBS formulates a specific execution solution for the reconfiguration command, for example, subordinate nodes (such as UE1, UE2, . . . , UE15) specifically involved in the reconfiguration, and reconfiguration time control: spectrum switchover from f1 to f2 is implemented within 2 seconds; the base station sends the spectrum reconfiguration command to a subordinate node needing reconfiguration and executes reconfiguration (i.e., spectrum resource switching) of the base station, and the subordinate node accesses to the new spectrum f2 according to the spectrum reconfiguration command.

Step 6: Completion of reconfiguration: After completing reconfiguration from f1 to f2, UE1, UE2, . . . , UE15 feed back reconfiguration completion acknowledgement to the RBS. The RBS collects feedback results of the subordinate UEs, and feeds back resource reconfiguration completion to the CCP1. The CCP1 updates spectrum resource configuration information and sends a reconfiguration completion DB information update request to the DB. After receiving the resource reconfiguration completion sent by the CCP1, the DB updates information of use conditions of TVWS resources.

Step 7: Performance monitoring: After completion of reconfiguration, the base station and subordinate nodes thereof complete reconfiguration acknowledgement finally, and then a related node needs to monitor the overall system performance. For example, a reconfiguration base station needs to monitor performance within the coverage of the reconfiguration base station. CCPs triggering reconfiguration and participating in reconfiguration need to monitor system performance within their respective control ranges. The DB monitors performance indexes of the incumbent user system, if a performance monitoring result indicates that the reconfiguration system performance fails to achieve an expected performance or serious interference is caused to the incumbent user system, reconfiguration rollback (i.e., returning to the status before the reconfiguration) is triggered or reconfiguration is triggered.

Indexes that need to be monitored include, but are not limited to: user throughput, a spectrum efficiency, a coverage rate, mobility management feature indexes (such as a switchover success rate and switchover delay), quality indexes (such as a PS service download speed, service call delay and voice quality).

Figure 7:
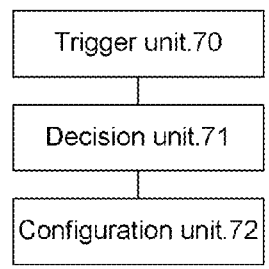
FIG. 7 is a structural diagram of a spectrum resource reconfiguration device of the disclosure.

FIG. 7 is a structural diagram of a spectrum resource reconfiguration device of the disclosure. As shown in FIG. 7, the spectrum resource reconfiguration device of the disclosure includes: a trigger unit 70, a decision unit 71 and a configuration unit 72.

The trigger unit 70 is configured to trigger spectrum resource reconfiguration;

the decision unit 71 is configured to generate a spectrum resource reconfiguration decision; and the configuration unit 72 is configured to configure spectrum resources to a to-be-configured link according to the reconfiguration decision.

The decision unit 71 generating the spectrum resource reconfiguration decision includes: a reconfiguring system generates reconfiguration decisions according to different reconfiguration trigger events, specifically including:

configure spectrum resource for a network node sending a spectrum resource request; or when an incumbent user appears, stop to use a designated spectrum being used and perform spectrum resource reconfiguration; or perform spectrum resource reconfiguration, and coordinate interference between neighbouring network nodes; or perform spectrum resource optimization reconfiguration according to the priority of a network node.

Based on the spectrum resource reconfiguration device as shown in FIG. 7, the spectrum resource reconfiguration device of the disclosure further includes an acquisition unit (not shown in FIG. 7). The acquisition unit is connected between the trigger unit 70 and the decision unit 71, and is configured to acquire information required by the spectrum resource reconfiguration decision. The information required by the spectrum resource reconfiguration decision includes at east one of the followings:

currently available spectrum resources, load information of the to-be-configured link, information of currently occupied spectrum resources, quality of service status information, and information of each user.

Those skilled in the art should understand that the acquisition unit is configured to optimize the technical solution of the spectrum resource reconfiguration device of the disclosure, but is not a necessary technical feature for implementing the spectrum resource reconfiguration device of the disclosure.

The trigger unit 70 is further configured to determine whether to perform the spectrum resource reconfiguration, according to incumbent user information acquired from a DB, or reconfiguration information of a reconfiguration system in a neighbouring area, or a spectrum sensing and measurement result or spectrum resource reconfiguration request information of a subordinate node.

The trigger unit 70 is further configured to trigger the spectrum resource reconfiguration when the configured spectrum resources are reoccupied by an incumbent user, or when resource reconfiguration of a neighbouring area interfere with the reconfiguration system, or when a spectrum resource request of a subordinate network node is received.

Based on the spectrum resource reconfiguration device as shown in FIG. 7, the spectrum resource reconfiguration device of the disclosure further includes a measurement unit (not shown in FIG. 7) and an adjustment unit (not shown in FIG. 7).

The measurement unit is configured to sense and measure configured spectrums of a link;

the adjustment unit is connected with the configuration unit 72, and is configured to adjust the spectrum resource reconfiguration decision according to an acquired sensing and measurement result; and the configuration unit 72 is further configured to reconfigure the spectrum resources to the to-be-configured link according to the adjusted reconfiguration decision.

The adjustment unit is further configured to, when it is determined that unexpected interference exists in the link configured with the spectrum resources, perform interference source coordination or reconfigure new spectrum resources; and when it is determined that a spectrum resource configuration coverage is within a guard band of an incumbent user, reduce transmission power or reconfigure new spectrum resources.

Based on the spectrum resource reconfiguration device as shown in FIG. 7, the spectrum resource reconfiguration device of the disclosure further includes:

a completion unit configured to feed back a spectrum resource configuration result after the spectrum resource configuration of the link is completed, and update spectrum resource configuration data.

Based on the spectrum resource reconfiguration device as shown in FIG. 7, the spectrum resource reconfiguration device of the disclosure further includes:

a monitoring unit configured to perform performance monitoring on the link configured with the spectrum resources, including: reconfiguration systems triggering reconfiguration and/or participating in reconfiguration monitor system performances in respective control ranges of the reconfiguration systems triggering reconfiguration and/or participating in reconfiguration, and/or a DB monitors performance of an incumbent user system;

wherein monitored indexes include at least one of the followings:

user throughput, a spectrum efficiency, a coverage rate, mobility management feature indexes and quality indexes;

wherein the mobility management feature indexes include a switchover success rate and/or switchover delay, and the quality indexes include at least one of the followings: a service download speed, service call delay and voice quality.

Those skilled in the art should understand that functions implemented by each processing unit in the spectrum resource reconfiguration device as shown in FIG. 7 should be understood with reference to related descriptions of the spectrum resource reconfiguration method and system. The function of each unit in the spectrum resource reconfiguration device as shown in FIG. 7 may be implemented by a program running on a processor, and may be also implemented by a specific logic circuit.

The above are only preferred embodiments of the disclosure. and are not used for limiting the scope of protection of the claims of the disclosure.

INDUSTRIAL APPLICABILITY

In the disclosure, a spectrum resource DB is set and stores currently available spectrum resources and used spectrum resources. In this way, when insufficient spectrum resources occur on some links or spectrum resources are unavailable, a system may configure corresponding spectrum resources to the links according to currently available spectrum resources, so that it is ensured that the links with insufficient spectrum resources have available resources, thereby ensuring development of as many services as possible.

The invention claimed is:

1. A spectrum resource reconfiguration method, comprising:

after a reconfiguration system triggers spectrum resource reconfiguration, generating, by the reconfiguration system, a spectrum resource reconfiguration decision, and configuring spectrum resources to a to-be-configured link according to the spectrum resource reconfiguration decision, the method further comprising:

sensing and measuring configured spectrums of a link, and adjusting the spectrum resource reconfiguration decision according to an acquired sensing and measurement result, and reconfiguring the spectrum resources to the to-be-configured link according to the adjusted spectrum resource reconfiguration decision, wherein the step of adjusting the spectrum resource reconfiguration decision according to an acquired sensing and measurement result comprises:

when it is determined that unexpected interference exists in the link configured with the spectrum resources, performing interference source coordination or reconfiguring new spectrum resources; or when it is determined that a spectrum resource configuration coverage of the reconfiguration system is within a guard band of an incumbent user, reducing transmission power or reconfiguring new spectrum resources.

2. The method according to claim 1, further comprising: acquiring information required by the spectrum resource reconfiguration decision, wherein the information required by the spectrum resource reconfiguration decision comprises at least one of the followings:

currently available spectrum resources, load information of the to-be-configured link, information of currently occupied spectrum resources, quality of service status information, and information of each user.

3. The method according to claim 1, wherein the reconfiguration system triggering the spectrum resource reconfiguration comprises:

determining, by the reconfiguration system, whether to perform the spectrum resource reconfiguration according to incumbent user information acquired from a Data Base (DB), or reconfiguration information of a reconfiguration system in a neighbouring area, or a spectrum sensing and measurement result or spectrum resource reconfiguration request information of a subordinate node.

4. The method according to claim 1, wherein the reconfiguration system triggers the spectrum resource reconfiguration when the configured spectrum resources are reoccupied by an incumbent user, or when resource reconfiguration of a neighbouring area interfere with the reconfiguration system, or when a spectrum resource request of a subordinate network node is received.

5. The method according to claim 1, wherein the step of generating the spectrum resource reconfiguration decision comprises:

generating, by the reconfiguration system, reconfiguration decisions according to different reconfiguration trigger events, comprising:

configuring spectrum resource for a network node sending a spectrum resource request; or stopping to use a designated spectrum being used when an incumbent user reoccupies a spectrum resource; or stopping to use a designated spectrum being used and performing the spectrum resource reconfiguration when an incumbent user reoccupies a spectrum resource; or performing the spectrum resource reconfiguration and coordinating interference between neighbouring network nodes; or performing spectrum resource optimization reconfiguration according to a priority of a network node.

6. The method according to claim 1, further comprising: after the spectrum resources are configured to the to-be-configured link according to the spectrum resource configuration decision, receiving a feedback on resource reconfiguration completion conditions from a network node of the to-be-configured link, and updating reconfiguration data.

7. The method according to claim 1, further comprising: after the reconfiguration system completes reconfiguration acknowledgement, monitoring, by a related node, overall system performance, comprising:

monitoring, by reconfiguration systems triggering reconfiguration and/or participating in reconfiguration, system performance in respective control ranges of the reconfiguration systems triggering reconfiguration and/or participating in reconfiguration; and/or monitoring, by a DB, performance of an incumbent user system;

wherein indexes of the performance monitoring comprise at least one of the followings:

user throughput, a spectrum efficiency, a coverage rate, mobility management feature indexes and quality indexes;

wherein the mobility management feature indexes comprise a switchover success rate and/or switchover delay, and the quality indexes comprise at least one of the followings: a service download speed, service call delay and voice quality.

8. A spectrum resource reconfiguration device, comprising:

a processor; and a memory for storing instructions executable by the processor;

wherein the processor is configured to:

trigger spectrum resource reconfiguration;

generate a spectrum resource reconfiguration decision; and configure spectrum resources to a to-be-configured link according to the reconfiguration decision, wherein the processor is further configured to:

sense and measure configured spectrums of a link;

adjust the spectrum resource reconfiguration decision according to an acquired sensing and measurement result; and reconfigure the spectrum resources to the to-be-configured link according to the adjusted reconfiguration decision, wherein the processor is further configured to:

when it is determined that unexpected interference exists in the link configured with the spectrum resources, perform interference source coordination or reconfigure new spectrum resources; and when it is determined that a spectrum resource configuration coverage is within a guard band of an incumbent user, reduce transmission power or reconfigure new spectrum resources.

9. The device according to claim 8, wherein the processor is configured to:

acquire information required by the spectrum resource reconfiguration decision, wherein the information required by the spectrum resource reconfiguration decision comprises at least one of the followings:

currently available spectrum resources, load information of the to-be-configured link, information of currently occupied spectrum resources, quality of service status information, and information of each user.

10. The device according to claim 9, wherein the processor is further configured to:

perform performance monitoring on the link configured with the spectrum resources, comprising: reconfiguration systems triggering reconfiguration and/or participating in reconfiguration monitor system performances in respective control ranges of the reconfiguration systems triggering reconfiguration and/or participating in reconfiguration, and/or a DB monitors performance of an incumbent user system;

wherein monitored indexes comprise at least one of the followings:

user throughput, a spectrum efficiency, a coverage rate, mobility management feature indexes and quality indexes;

wherein the mobility management feature indexes comprise a switchover success rate and/or switchover delay, and the quality indexes comprise at least one of the followings: a service download speed, service call delay and voice quality.

11. The device according to claim 8, wherein the processor is configured to: determine whether to perform the spectrum resource reconfiguration, according to incumbent user information acquired from a Data Base (DB), or reconfiguration information of a reconfiguration system in a neighbouring area, or a spectrum sensing and measurement result or spectrum resource reconfiguration request information of a subordinate node.

12. The device according to claim 8, wherein the processor is further configured to: trigger the spectrum resource reconfiguration when the configured spectrum resources are reoccupied by an incumbent user, or when resource reconfiguration of a neighbouring area interfere with the reconfiguration system, or when a spectrum resource request of a subordinate network node is received.

13. The device according to claim 8, wherein the processor is further configured to:

feed back a spectrum resource configuration result after the spectrum resource configuration of the link is completed, and update spectrum resource configuration data.

14. The device according to claim 8, wherein the processor is further configured to:

perform performance monitoring on the link configured with the spectrum resources, comprising: reconfiguration systems triggering reconfiguration and/or participating in reconfiguration monitor system performances in respective control ranges of the reconfiguration systems triggering reconfiguration and/or participating in reconfiguration, and/or a DB monitors performance of an incumbent user system;

wherein monitored indexes comprise at least one of the followings:

user throughput, a spectrum efficiency, a coverage rate, mobility management feature indexes and quality indexes;

wherein the mobility management feature indexes comprise a switchover success rate and/or switchover delay, and the quality indexes comprise at least one of the followings: a service download speed, service call delay and voice quality.

15. A spectrum resource reconfiguration system, comprising a Data Base (DB), a Central Control Point (CCP) and a Reconfiguration Base Station (RBS), wherein the DB is configured to store spectrum resource status information of a main system and information of White Space (WS) resources of the main system used by the CCP;

the CCP is connected with the DB, and is configured to: collect WS resource requests from the RBS, send a WS resource configuration request to the DB; coordinate and configure acquired WS resources to the RBS; receive a spectrum resource reconfiguration command from the DB, control the RBS to perform spectrum resource reconfiguration; feed back a configuration update message to the DB; and send a sensing and measurement configuration message to the RBS, and feed a sensing and measurement result back to the DB; and the RBS is connected with the CCP, and is configured to configure WS resources indicated by the CCP to each radio link, change or adjust a wireless communication parameter according to an indication of the CCP and perform spectrum sensing and measurement, wherein the spectrum status information of the main system comprises at least one of the followings: information of spectrum resources being used, information of unused spectrum resources and information of prohibited spectrum resources;

wherein the information of the spectrum resources being used comprises at least one of the followings: frequency points, bandwidths, possible durations, coverage and isolation bands;

the information of the unused spectrum resources comprises at least one of the followings: frequency points, working bandwidths, coverage, possible durations and maximum allowed transmission power;

the information of the prohibited spectrum resources comprises at least one of the followings: frequency points and working bandwidths; and the information of the WS resources of the main system used by the CCP comprises at least one of the followings:

a frequency point and a bandwidth of a WS used by the CCP, and a location of the CCP using the WS.

* * * * *